Oct. 29, 1968  F. R. HILL  3,407,527

FISH ROD HOLDER

Filed March 22, 1966

INVENTOR.
FRANK R. HILL
BY  C B Messenger
ATTORNEY

United States Patent Office 3,407,527
Patented Oct. 29, 1968

3,407,527
FISH ROD HOLDER
Frank R. Hill, Arvada, Colo., assignor of one-third to Frank R. Hill, Sr., and one-third to Louis S. Ridgeway, San Diego, Calif.
Filed Mar. 22, 1966, Ser. No. 536,330
6 Claims. (Cl. 43—15)

ABSTRACT OF THE DISCLOSURE

A fishing pole holder for pivotally supporting a fishing pole on an upright standard which incorporates an automatic trip release mechanism active to bring the pole into a raised position to hook a fish. The fish rod is maintained in a lowered position against a spring pressure by a trip mechanism inclusive of a locking leg and a main catch element. A trigger is engaged with the trip lever to hold the trip lever in elevated position until the fishing line is tensioned, as by a fish, to initiate movement of the trigger. The trip lever falls under gravitational influence and releases the main catch, and thereafter the spring moves the fishing pole to an elevated position. The support provides a bent portion to facilitate placement of the fish pole holder for use.

---

The present invention relates to a fish rod holder of a type which may be used at shore lines or in boats. The main function of the device is to receive and hold a fishing rod so that it is unnecessary for the fisherman to continually hold and attend the rod.

In addition to its rod holding function, the apparatus is provided with functional elements which satisfy the following objectives:

A first objective is to provide a rod holder having a trip release mechanism which may be engaged by the fishing line so that a slight tensioning of the fishing line will cause positive release of the trip mechanism to pull the pole receiver into an alternate position for hooking or playing a fish.

Another object of the invention is to provide a trip release mechanism which uses the force of gravity to assure proper release of the trip mechanism.

A further object of the invention is to provide means for adjusting the tension on the line engaging element so that the force necessary to cause actuation of the trip mechanism can be adjusted.

Another object of the invention is to provide a fish rod holder that can be easily implanted in desired position along a shore line or which may be easily mounted in a boat.

Another object of the invention is to provide a trip mechanism inclusive of an auxiliary or pilot catch element that may be activated by minor forces to cause release of a primary or main catch element used for holding and releasing the pole engaging members of the invention.

Further objects and advantages of the present invention will be apparent from the appended description and drawings, in which—

Figures 1, 2, 3:
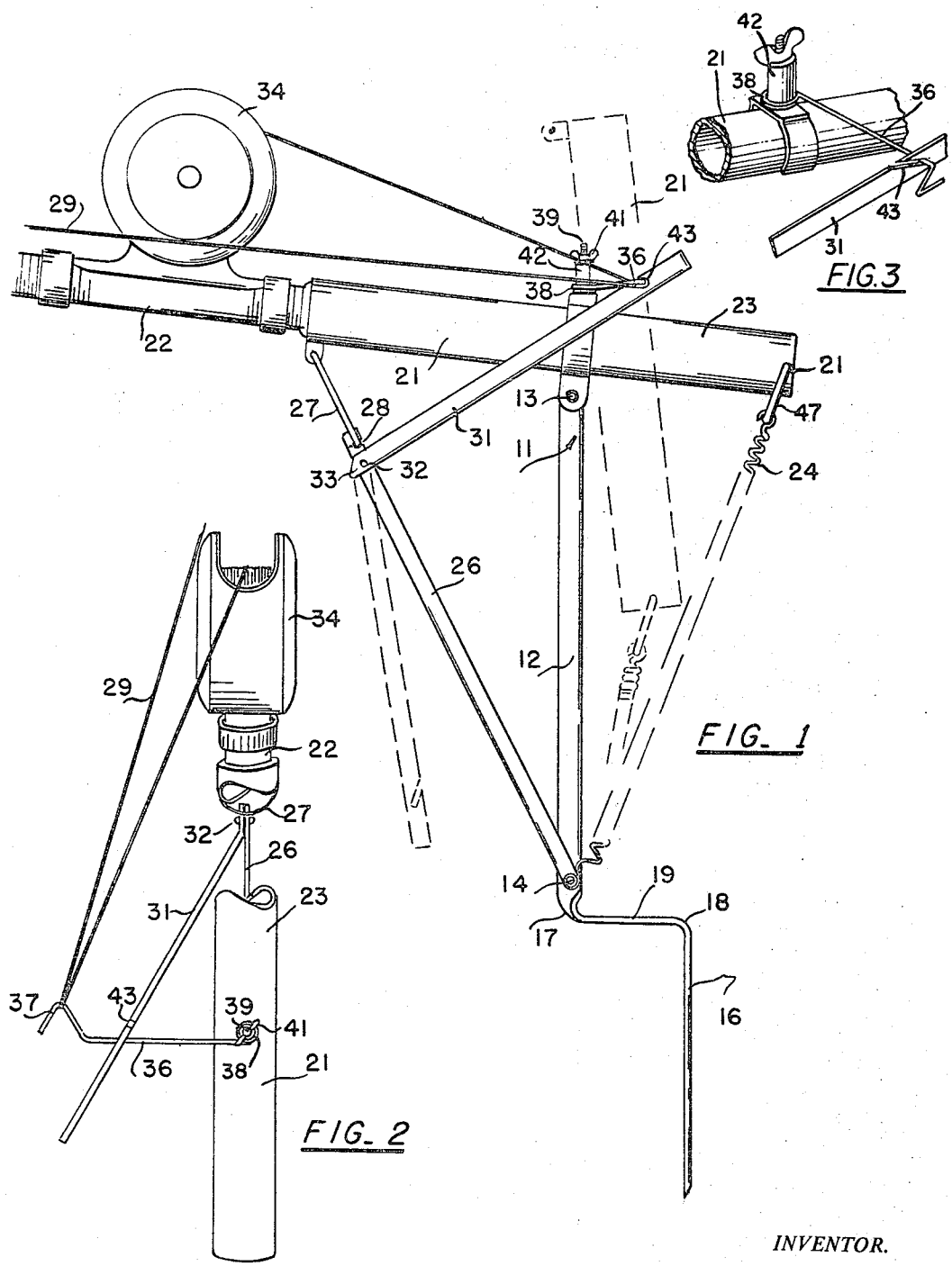
FIG. 1 is a side elevation showing the general features of an embodiment of this invention with certain elements thereof being shown in engaged (in solid lines) and in alternate released (in dashed lines) positions.
FIG. 2 is a top plan view in partial section showing additional features of an embodiment of the invention.
FIG. 3 is a detail perspective view showing the trigger mechanism.

Briefly stated, the present invention provides a fishing pole holder that will support a fishing pole pivotally on an upright standard so that the pole may be retained in an alert extended position while waiting for a fish bite and which incorporates an automatic trip-release mechanism which will act to bring the pole into an alternate raised position in a manner that will serve to hook a fish any time that a bite or nibble acts to move the line. A preferred embodiment includes an upright standard having a bent portion thereon to facilitate placement of the holder at the shore line or in a boat. A fish rod support receptable is pivotally mounted to the upper end of the standard so that a fish rod may be engaged therein. The receptacle and fish rod are maintained in a lowered position against spring pressure which tends to move the support to an elevated position by a trip mechanism inclusive of a locking leg and a main catch element. A trigger, which is engaged with a trip lever, is positioned to hold the trip lever in elevated position until the fishing line which passes over the trigger is tensioned. With the resultant movement of the trigger, the trip lever falls under gravitational influences and releases the main catch on the locking leg whereby the spring will move the fishing pole and its receptacle to the elevated position. This automatic movement of the fishing pole jerks the fish hook and usually catches any fish that has been nibbling or biting at the line.

Detailed features of an embodiment of the invention are shown in the accompanying figures, where the fish pole holder 11 is shown to include an upright standard 12 providing an upper pivot 13 and a lower pivot 14. The standard 12 is provided with a lower bent leg extension 16, which is, and preferably may be, formed unitarily with the standard 12. As illustrated, the standard, inclusive of the bent leg 16, may be formed out of a single piece of strap material which is bent and rotated at the combined bend 17 and which is recurved at the bend 18 to provide the structure illustrated. With this construction a single strap of rectangular cross-section can provide a standard that has considerable strength in the fore and aft directions and which can provide convenient support for the pivots 13 and 14. At its lower end, the same piece provides a step 19 and the leg extension 16 so that the leg extension 16 with its rectangular cross-section disposed in lateral directions can be easily implanted on the stream side or so that the same leg can be clamped to the side of a boat with the step segment 19 being conveniently positioned on the gunwale of the boat.

It has further been noted that this particular bending pattern provides a desirable flexible characteristic so that the standard is free to move under the influences of wind or in connection with the tugging movement of larger fish. If the extension leg 16 is fully engaged in the ground so that the step segment 19 rests against the top surface of the ground, the fore and aft resilient movements of the standard are substantially minimized. Since the presence of the step makes it easy to engage the standard and its extension leg 16 in a stream side bank, it is possible to easily make adjustments in the positioning and consequent movement characteristics for the pole holder 11. Generally, it is believed that it will be preferable to install the holder 11 in a position close to that illustrated in FIG. 1 so that the standard 12 will be in a vertical position.

A tube support receptacle 21, which is pivotally mounted on the pivot 13 at the top of the standard 12, will normally be held in the first position illustrated in FIG. 1. With this arrangement, a fishing pole 22 received in the tube 23 which makes up the fishing rod support 21 will be slightly elevated outwardly so that the fish line emanating from the tip of the pole will be elevated above the waters being fished. The pole support 21 is held in this position by tension forces exerted by the spring 24 and resisted by the locking leg 26 and a front bail 27 engaged in a main catch 28 on the locking leg 26.

In order to automatically move the fishing pole whenever anything disturbs the fish line 29 and in an attempt to catch or to hook anything disturbing the hooks at the end of the fish line, a trip mechanism is provided for disengaging the bail 27 from the main catch 28. This automatic release mechanism includes a trip lever 31 which is pivotally mounted on the free end of the locking leg 26 by the pin 32 so that an action end 33 of the lever 31 may be rotated to engage the bail 27 and displace the bail from its engagement with main catch 28. Obviously, gravitational movement of the trip lever 31 away from its primary illustrated position will accomplish this displacement of the bail 27 so that the action of the spring 24 will move the rod support 21 to its alternate elevated position as shown in dotted outline in FIG. 1. The quick spring, energized movement to this elevated position serves to tension the fish line and to set the hook. One function of the apparatus shown is to make this movement automatic at any time that a fish nibbles or tugs at the fish line.

The mechanism used is shown in both FIGS. 1 and 2, where it will be noted that fish line 29 coming from the reel 34 is first engaged with a trigger 36 before the line is threaded through the eyelets and tip of the pole 22. The trigger 36 is provided with a line engaging notch 37 (FIG. 2) at its free end and a bent eye 38 at its opposite end. The eye portion encircles a vertically disposed threaded shaft 39, and a wing nut 41 on the shaft may be used to exert adjustable force against a rubber cylinder or grommet 42 likewise disposed about the shaft 39. As the tension is increased by adjustment of the wing nut 41, the force necessary to cause rotation of the trigger 36 is likewise increased. When in use, the trigger 36 is engaged with a pilot catch 43 cut in trip lever 31. Any forward rotation of trigger 36 will pull the trigger out of engagement with the catch 43 so that the trip lever 31 will automatically fall to disengage the bail 27 from main catch 28.

Depending on the fish that are to be caught and the wind or other disturbing forces that might be experienced, proper adjustment can be made of the tension on the trigger 36 so that the trip mechanism of the fish pole holder will only be instituted when a fish has made a pass at the bait or lure on the line. For small fish and on calm days, the tension can be substantially reduced or it could even be eliminated, since movement of the trigger in the catch 43 will itself be resisted by friction forces existing between the trigger and the sides of the pilot catch 43 due to the weight of the trip lever 31. Since the trigger 36, however, moves in a horizontal plane, this friction of engagement is not substantial. Accordingly, the mechanism can be set to release when only a slight nibble is exerted on the line. In use, it has been found that the reaction of this fishing pole holder is as quick as that of an experienced fisherman, and, accordingly, the mechanism has successfully caught small fish that were merely nibbling at the bait.

Once the fish is caught, the mechanism will tend to play the fish, since every tensioning force exerted on the line will be resisted by the spring 24 even though the pole holder 21 is in its alternate released and elevated position. If proper line tension is exerted by the reel, the holder 11 itself will play the fish. The mechanism illustrated has been tried extensively, and it has been found that many different types and sizes of fish can be caught by use of this apparatus if the tension on the trigger is properly regulated. The device has been used for stream, lake and surf fishing with equally good results. It has also been found possible to use this mechanism in fish trolling operations from power boats. For all such fishing activities, it is believed that the shape of the standard inclusive of the emplacement step 19 is beneficial.

In order to eliminate non-regulatable friction forces operative between the trigger and pilot catch, it has also been found desirable to maintain a horizontal rotating movement for the trigger 36. If trigger 36 moves out of a horizontally disposed pilot catch, friction force disruption of the operations are kept at a minimum. In order to emphasize this advantageous relationship, the rear extent of the catch 43 is slightly elevated from a true horizontal position in FIG. 1. This slight elevation will compensate for instances in which the pole holder 11 is engaged with the ground at a backwardly tilted angle.

Further, it should be noted that while the applicant has shown use of a hollow tube 23 for a pole holding receptacle, any other support element which engaged and held the pole would be acceptable. Where a tube is used, the rear bail 47 which joins the tube and the spring 24 can have its ends extending into the center of the tube so that the handle of the pole will not pass. An adjustable collar or latch can also be provided at the forward end of the tube so that the pole will be retained in its receptacle until removed by the fisherman. When the pole is removed, the fish pole holder 11 can be folded into a substantially contracted configuration for convenient storage or carrying. The locking leg 26 and trip lever 31 in folded relation can be moved to a position engaged behind the pivot 13. When in this position, the tube 23, standard 12, spring 24, locking leg 26 and lever 31 are quite compact and may be easily carried or stored.

Actually, use of the mechanism is quite simple. The fisherman with only little experience can properly adjust the resistance for the trigger 36. Since the trip release forces are not acting on the trigger and since the main release force is actually derived from the falling movement of the trip lever 31, the forces necessary to institute trigger movement are quite slight and do not need to be too delicately balanced in order to assure acceptable operation of the device. It is believed that the use of a pilot catch and main catch combination together with a drop lever makes the use of this type apparatus practical and beneficial. The serial release of the catches provides a highly responsive mechanism that fully serves the objectives set forth.

I claim:

1. A fish rod holder for automatically elevating a fish rod received thereon in response to tensioning of a fish line on said pole comprising a standard, a pivot on said standard, a fish rod receptacle pivotally mounted on said support and pivot, a spring element engaged to said receptacle in a position away from said pivot and biased to move one end of said receptacle downwardly, a locking leg on said standard and extending therefrom toward said receptacle in position away from said point of spring engagement and pivot, a main catch element on said locking leg, a connector on said receptacle positioned for engagement in said main catch, said locking leg, main catch and connector acting to resist the forces of said spring for maintaining said receptacle in a first position, a trip lever pivotally mounted on said fish rod holder with an extension end adjacent said main catch, a pilot catch on said trip lever away from said extension, and a trigger element positioned for selective engagement with said pilot catch for holding the associated end of said trip lever in position elevated with respect to a free standing position therefor, said trigger providing means for engaging the fish line of said pole and being movable in response to tension forces exerted on said line whereby said trip lever may be released to fall under influences of gravity displacing said connector and main catch and actuating movement of said receptacle to a second position under forces exerted by said spring.

2. Structure as set forth in claim 1 inclusive of adjusting means associated with said trigger for regulating the fish line tension force that must be exerted to cause release of the trigger from said pilot catch.

3. Structure as set forth in claim 1 wherein said connector is a free swinging bail pivotally mounted on said receptacle.

4. Structure as set forth in claim 1 wherein the extension end and pilot catch end of said trip lever are disposed in opposite directions away from the pivot mounting for said trip lever.

5. Structure as set forth in claim 1 wherein said standard provides an end adapted for engagement in the ground and wherein the standard is bent to provide a step to facilitate such ground emplacement.

6. Structure as set forth in claim 1 wherein said trigger is disposed for rotation in a horizontal plane and wherein said pilot catch is a cut slot in said trip lever disposed to engage said trigger.

References Cited

UNITED STATES PATENTS

| 2,964,868 | 12/1960 | Bennett | 43—15 |
| 3,055,136 | 9/1962 | Scott et al. | 43—15 |

ALDRICH F. MEDBERY, *Primary Examiner.*

D. J. LEACH, *Assistant Examiner.*